A. C. MESSENGER.
Carburetor.

No. 55,778.

2 Sheets—Sheet 1.

Patented June 19, 1866.

WITNESSES:

INVENTOR.

A. C. MESSENGER.
Carburetor.

2 Sheets—Sheet 2.

No. 55,778.

Patented June 19, 1866.

WITNESSES:

INVENTOR.

UNITED STATES PATENT OFFICE.

A. C. MESSENGER, OF SYRACUSE, NEW YORK, ASSIGNOR TO HIMSELF AND A. T. SMITH, OF SAME PLACE.

IMPROVED APPARATUS FOR CARBURETING AIR, GAS, &c.

Specification forming part of Letters Patent No. 55,778, dated June 19, 1866.

*To all whom it may concern:*

Be it known that I, A. C. MESSENGER, of Syracuse, in the county of Onondaga and State of New York, have invented a new and Improved Apparatus for Purifying and Multiplying Gas; and I do hereby declare that the following is a full, clear, and exact description thereof, reference being had to the accompanying drawings, making a part of this specification, in which—

Figure 1:
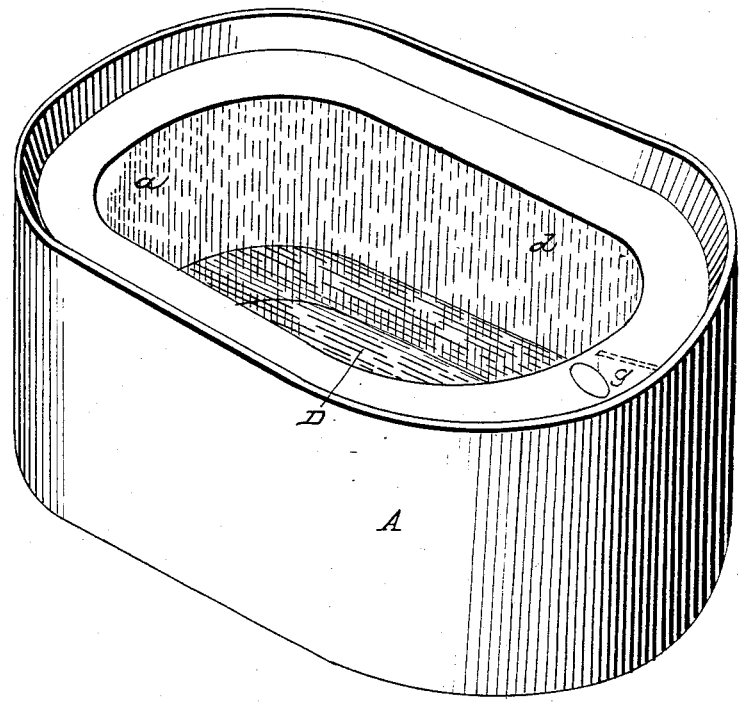
Figure 3:
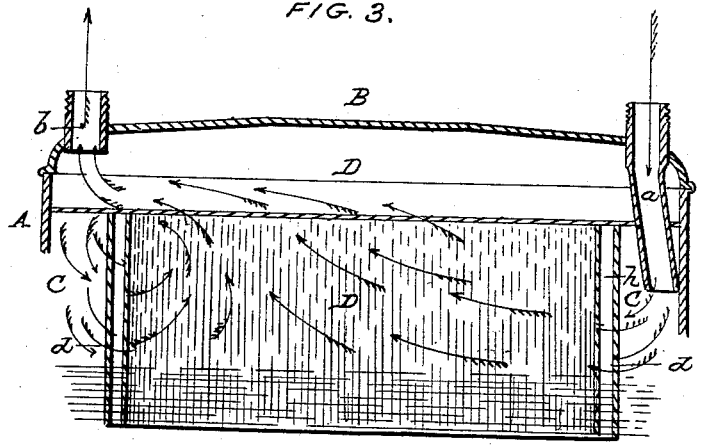
Figure 2:
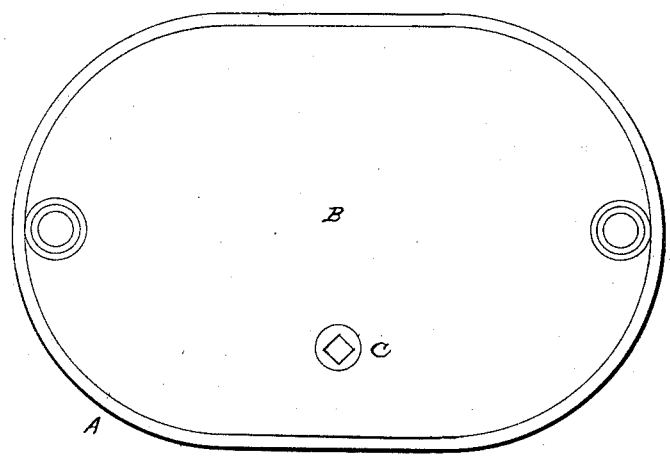
Figure 4:
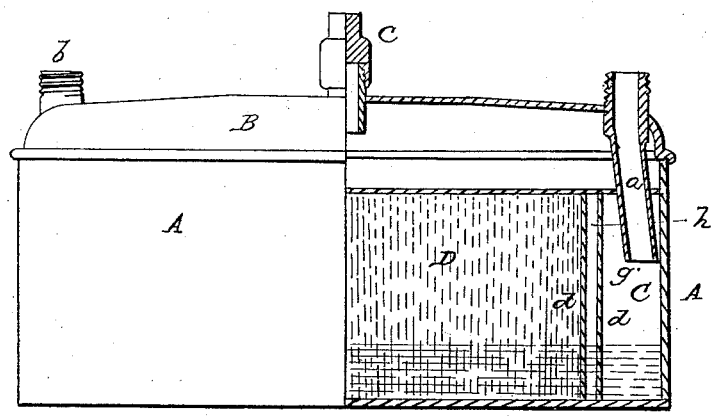

Figure 1 is a perspective view of the apparatus with the cover removed. Fig. 2 is a top view of the apparatus, showing the induction and eduction passages. Fig. 3 is a vertical central section taken longitudinally through the apparatus. Fig. 4 is a half-sectional view of the same.

Similar letters of reference indicate corresponding parts in the several figures.

This invention relates to a new and improved apparatus for purifying and enriching common illuminating-gas or carbureted hydrogen, where this gas is caused to pass through a vessel containing any of the highly volatile fluid hydrocarbons.

One object of my invention is to present the greatest possible evaporating-surface in the smallest compass, or in a given compass, and at the same time to have a chamber for the carbureted gas, from which this gas can slowly escape to be burned.

Another object of the invention is to employ within a suitable vessel a perforated or porous double-wall partition, between which cotton-wicking or other equivalent substance is applied and supported for the purpose of absorbing the fluid hydrocarbon and distributing it over a large surface, through which the gas is forced, purified, and enriched, as will be hereinafter described.

To enable others skilled in the art to understand my invention, I will describe its construction and operation.

In the accompanying drawings, A represents a vessel, which may be made of any suitable shape and size. I prefer to make it of a cylindrical form, or of the elliptical form shown in the drawings. B is the cover of this vessel, which has an induction-pipe, $a$, leading into an apartment, C, and an eduction-pipe, $b$, communicating with the central apartment, D. The opening, which is closed by the cap $c$, is used for supplying any suitable volatile hydrocarbon to the chambers. Within this vessel A a double-wall partition is applied, which forms the annular chamber C and the central chamber, D, above mentioned. These walls $d$ $d$ are made of wire cloth or finely-perforated plates of sheet metal, and they extend from the bottom of the vessel A nearly to its top, with a space between them, which is filled with cotton-wicking $g$, or any suitable capillary substance which will absorb and carry up the fluid between the perforated walls.

The upper part of the chamber C is covered by means of a plate, $h$, so that all the gas which enters the chamber D is compelled to pass through the perforated walls $d$ $d$, and also through the substance $g$, which is confined between these walls, as indicated by the arrows in the sectional view, Fig. 3.

In order to facilitate the circulation of the gas in the chamber C, and to compel the gas to take the longest course around this chamber, I introduce a partition, $g'$, near the inlet-opening $a$, which prevents the gas from passing in two directions around the walls $d$ $d$.

The gas-pipes are suitably secured to the screw-caps on the tubes $a$ $b$, and the cap $c$ is removed for the introduction of any suitable fluid hydrocarbon, after which the cap $c$ is replaced, and the gas allowed to enter the chamber C and escape through the perforated walls $d$ $d$ and wicking $h$ into the chamber D, from which latter the gas passes off to be burned through the opening $b$.

The perforated walls $d$ $d$ serve as supports for a capillary substance, which carries up the liquid from the bottom of vessel A, and which distributes this liquid in a thin sheet over the entire partition which separates the two chambers C and D. Thus it will be seen that the gas is brought in direct contact with the fluid hydrocarbon in passing through the partition and wicking into the chamber D, and in this manner the gas is highly charged with the vapor and greatly enriched thereby.

The perforated walls $d$ $d$ not only serve as a means for supporting the wicking $h$, and to allow of the free escape of gas through them, but these walls prevent the fluid hydrocarbon from being carried off with the gas in undue quantities.

I am aware that gas-light multipliers have been constructed before my invention, in which porous substances have been used in conjunction with perforated plates; but such plates and substances were differently arranged to mine, and are liable to many serious objections, which are removed by my arrangement. Therefore I do not claim, broadly, the use of perforated plates and capillary substances when arranged within vessels for carbureting gas for illuminating purposes upon a different principle from that involved by my arrangement.

Having thus described my invention, what I claim as new, and desire to secure by Letters Patent, is—

1. In an apparatus for carbureting gas for illuminating purposes, the use of double perforated walls $d$ $d$, having a suitable capillary substance confined between them, said walls being so arranged as to form a porous division through which the gas is forced, substantially as described.

2. The forming of two apartments in a vessel, A, by means of an upright double-wall partition which is rendered sufficiently porous to allow of the absorption of the fluid in said vessel and the passage of gas through it, substantially as described.

3. Subdividing the chamber C by means of a partition which is applied on one side of the induction-passage $a$, for the purpose and in the manner substantially as described.

A. C. MESSENGER.

Witnesses:
R. H. GARDNER,
HARRY GIFFORD.